(12) United States Patent
Sato et al.

(10) Patent No.: US 6,214,619 B1
(45) Date of Patent: *Apr. 10, 2001

(54) WATER SWELLABLE THERMOPLASTIC POLYURETHANE GEL BIOREACTOR CARRIER CONTAINING A NUTRIENT SUBSTANCE

(75) Inventors: Takaya Sato; Tsutomu Uehara; Hiroshi Yoshida, all of Tokyo (JP)

(73) Assignee: Nisshinbo Industries, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/990,192

(22) Filed: Dec. 12, 1997

(30) Foreign Application Priority Data

Dec. 17, 1996 (JP) ........................................ 8-353331

(51) Int. Cl.⁷ .............................. C12N 5/00; C12N 11/08; C07F 3/00; C12M 1/00
(52) U.S. Cl. .................... 435/397; 210/601; 210/610; 210/611; 435/180; 435/396; 435/262.5; 435/289.1
(58) Field of Search .................................... 435/174, 176, 435/177, 180, 182, 396, 397, 262.5, 289.1; 210/601, 610, 611

(56) References Cited

U.S. PATENT DOCUMENTS

| | | | |
|---|---|---|---|
| 4,576,718 | 3/1986 | Reischl et al. | 210/616 |
| 4,843,105 | * 6/1989 | Reischl et al. | 521/54 |
| 5,284,587 | 2/1994 | Wong et al. | 210/601 |
| 5,580,770 | 12/1996 | DeFilippi | 435/180 |
| 5,980,738 | * 11/1999 | Heitkamp et al. | 210/150 |
| 6,011,110 | * 1/2000 | Sato et al. | 524/491 |

FOREIGN PATENT DOCUMENTS

| | | |
|---|---|---|
| 0 304 143 | 2/1989 | (EP) . |
| 0 465 131 | 1/1992 | (EP) . |
| 0 481 226 | 4/1992 | (EP) . |
| 3-258398 | 11/1991 | (JP) . |
| 4-320685 | 11/1992 | (JP) . |
| 9-51794 | 2/1997 | (JP) . |
| WO95/08513 | 3/1995 | (WO) . |

* cited by examiner

Primary Examiner—David M. Naff
(74) Attorney, Agent, or Firm—Wenderoth, Lind & Ponack, L.L.P.

(57) ABSTRACT

A bioreactor carrier is provided using an organic polymer substance having a water absorptivity of 50 to 1,700%, and containing an inorganic salt, organic nitrogen source and/or organic carbon source utilizable as a nutrient by animal cells, plant cells and/or microorganisms which fix to the carrier for uses such as substance production, harmful substance treatment, waste oil treatment, wastewater treatment and deodorization. A preferred polymer substance is a water swellable thermoplastic polyurethane gel having the water absorptivity and a swelling rate of volume of 150 to 4,000%. The polyurethane gel is obtained by reacting together a long-chain diol compound, a short-chain diol compound and a diisocyanate compound. The long-chain diol compound has a number-average molecular weight of 400 to 10,000, and is selected from an ethylene oxide-propylene oxide copolymer having an ethylene oxide content not less than 70% and a polyethylene glycol. The short-chain diol compound has a number-average molecular weight of 30 to 400. The diisocyanate compound has a number-average molecular weight of 100 to 1,000 at an NCO/OH equivalency in the range of 1–5. Microorganisms multiply rapidly at the surface and interior of the carrier. Preferred adherence and proliferation of desired microorganisms is possible by appropriately selecting substances incorporated as microorganism nutrients.

1 Claim, 1 Drawing Sheet

WATER SWELLABLE THERMOPLASTIC POLYURETHANE GEL BIOREACTOR CARRIER CONTAINING A NUTRIENT SUBSTANCE

BACKGROUND OF THE INVENTION

1. Field of the Invention

This invention relates to a bioreactor carrier for use as a carrier to which animal cells, plant cells, microorganisms and/or protozoans are fixed to obtain a bioreactor for substance production, harmful substance treatment, waste oil treatment, wastewater treatment, deodorization and the like, and to a method of treating wastewater using the carrier.

2. Description of the Background Art

The carriers used in bioreactors are of two types: porous and gel (nonporous).

Porous carriers include those made of polyurethane, cellulose, polypropylene, polyvinyl formal and ceramic.

The porosity of these carriers gives them a large surface area. They are frequently used with animal cells, plant cells and/or microorganisms fixed to their porous surfaces.

Gel carriers include those made of polyurethane, polyethylene glycol, polyvinyl alcohol, polyacrylamide and alginic acid.

Although these gel carriers are generally used with animal cells, plant cells and/or microorganisms fixed by envelopment within the gel, they can also be used with animal cells, plant cells and/or microorganisms fixed to the gel surface.

Both the porous carrier and the gel carrier improve bioreactor treatment performance by retaining large numbers of the desired animal cells, plant cells and/or microorganisms. Their effect is consequently limited during startup, i.e., until the animal cells, plant cells and/or microorganisms have adhered to the carrier.

A preculture period is therefore particularly necessary when using slow-breeding animal and plant cells and/or autotrophic microorganisms.

Animal cell, plant cell and/or microorganism growth is also adversely affected when the nutrient environment in the bioreactor deviates from the optimum one for proliferation of the desired animal cells, plant cells and/or microorganisms.

Japanese Patent Application Laid-open Nos. 3-258398 and 4-320685 and Japanese Patent Application No. 8-139723, for example, teach that selective retention of desired animal cells, plant cells and/or microorganisms can be achieved by enveloping the cells and/or microorganisms in the carrier at the time it is produced. However, the production, storage and transport of the disclosed carriers must be conducted under restrictions regarding temperature, humidity, oxygen exposure and the like so as not to adversely affect microorganism growth.

As explained in the foregoing, one or the other of two ways must be used to secure preferential growth and proliferation of desired animal cells, plant cells and/or microorganisms at the surface or interior of the carrier. One is to use some method to envelop the microorganisms within, or adhere them to the surface of, the carrier in advance. The other is to culture them for whatever time necessary in a culture medium whose nutrient conditions have been optimized for the desired microorganisms. The invention is directed to overcoming the foregoing problems.

SUMMARY OF THE INVENTION

This invention provides a carrier for a bioreactor comprising an organic polymer substance which contains at least one substance utilizable as a nutrient by animal cells, plant cells and/or microorganisms useful in the bioreactor, e.g., an inorganic salt, an organic nitrogen source or an organic carbon source, and exhibits a water absorptivity of 50 to 1,700%. The invention also provides a method of biologically purifying wastewater in the presence of activated sludge in a reactor into which the bioreactor carrier has been cast.

The inorganic salt, organic nitrogen source and/or organic carbon source content is 5 to 100% based on the weight of the organic polymer substance.

Since the carrier according to the invention contains more substances utilizable as nutrients by microorganisms than ordinary carriers, it excels in power to retain microorganisms on its surface and in its interior.

Microorganisms multiply rapidly at the surface and interior of the carrier. The carrier exhibits particularly outstanding effect when used for microorganisms in wastewater treatment because it enables BOD digest bacteria, nitrification bacteria, denitrification bacteria and the like to proliferate rapidly. The wastewater treatment system can therefore be brought into service quickly. Moreover, preferential adherence and proliferation of desired microorganisms is possible by appropriately selecting the substances incorporated as microorganism nutrients. This is explained in detail below.

BRIEF DESCRIPTION OF THE DRAWING

The single FIGURE is a diagram for explaining a wastewater treatment system using a thermoplastic organic polymer compound having a water-swelling property according to the invention.

DETAILED DESCRIPTION OF THE PREFERRED EMBODIMENTS

Figure 1:
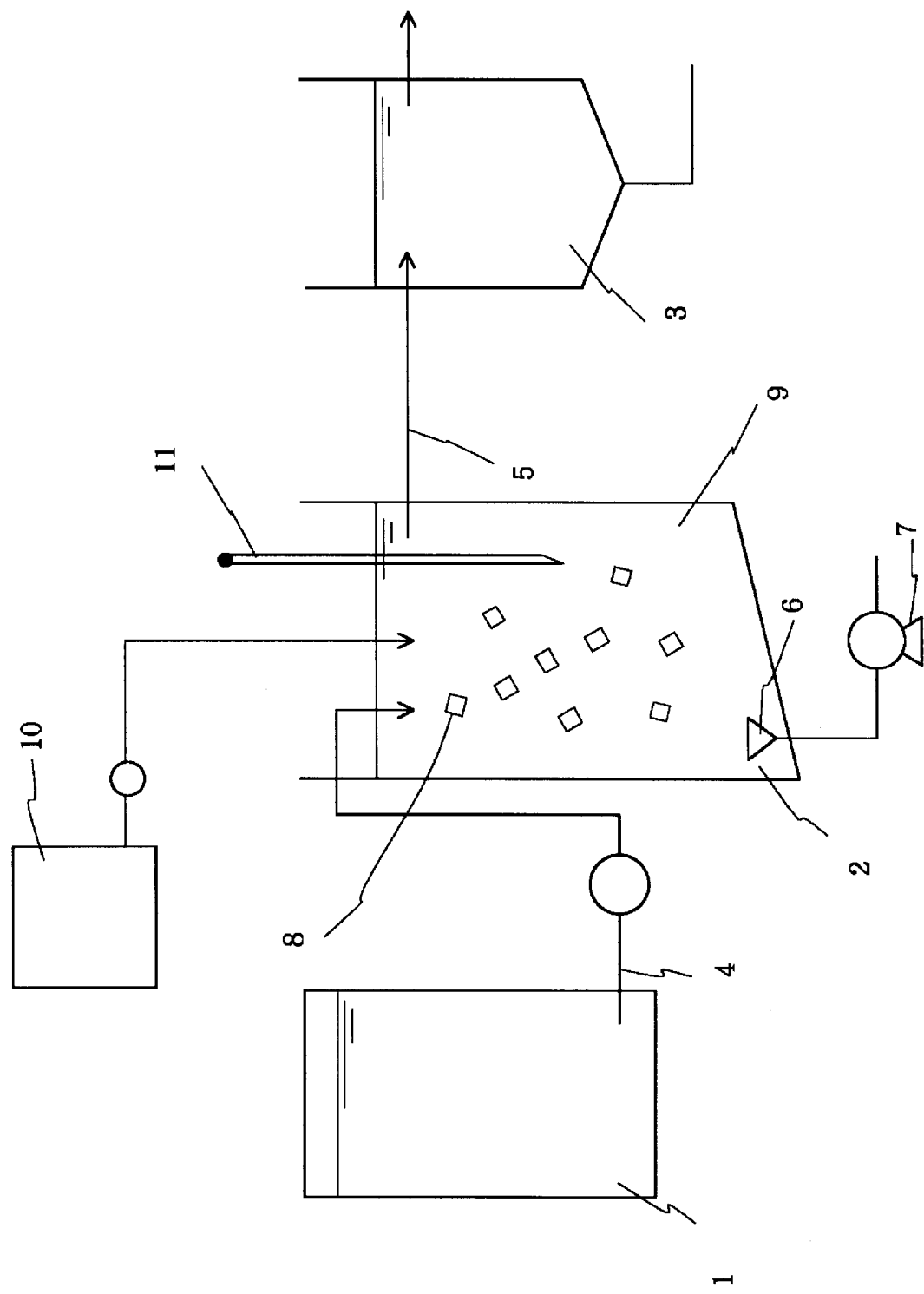

The at least one substance utilizable as a nutrient by animal cells, plant cells and/or microorganisms contained in the carrier according to the invention is one type or a mixture of two or more types selected from among nutrients in culture medium which most strongly promote proliferation of useful animal cells, plant cells and/or microorganisms in the bioreactor.

The amount of the one or more nutrient substances contained in the carrier is preferably 5 to 100%, more preferably 5 to 50%, based on the weight of the organic polymer substance constituting the carrier.

When the content in the carrier is less than 5%, no effect is obtained because the amount of the nutrient substance or substances is so small that the desired microorganisms cannot readily utilize them.

When the content in the carrier exceeds 100%, the physical strength of the carrier decreases to the point that the carrier is liable to disintegrate in the bioreactor during use.

As explained in the following, the nutrient substances vary depending on the desired animal cells, plant cells and/or microorganisms, and only desired animal cells, plant cells and/or microorganisms can be made to adhere and proliferate at the surface and interior of the carrier by selecting the substances added.

Nutrient substances for specific desired microorganisms will now be listed, taking the case of biological purification of wastewater as an example.

(1) BOD Digest Bacteria

Under aerobic conditions, these bacteria oxidize and decompose soluble organic substances into $CO_2$ and $H_2O$.

Nutrient substances:

Glucose, sucrose, lactose, starches and other saccharides and polysaccharides.

Amino acids, yeast extracts, proteins and other organic nitride compounds.

Cellulose and other substances that are decomposed into soluble organic substances.

Wheat bran, soybean lees, blackstrap molasses, waste pulp and other common refuse materials obtainable at low cost can also be utilized.

(2) Nitrification Bacteria

Under aerobic conditions, these bacteria oxidize ammonia state nitrogen into nitrate state nitrogen. In this process, they grow through synthesis of ingested carbon dioxide.

Nutrient Substances:

$NH_4Cl$, $(NH_4)_2SO_4$, $(NH_4)_2HPO_4$, ammonium acetate, ammonium carbonate, ammonium nitrate and other ammonium salts, and urea, amino acids and ammonia state nitrogen compounds. $Na_2CO_3$ $K_2CO_3$, $CaCO_3$ and other carbonates. $NaNO_2$, $KNO_2$ and other nitrites.

(3) Denitrification Bacteria

Under anaerobic conditions, these bacteria reduce nitrate state nitrogen to nitrogen gas by nitrate respiration utilizing soluble organic substances as hydrogen donors.

Nutrient Substances:

Soluble organic substances listed in (1), and $NaNO_3$, $KNO3$ and other nitrates.

In the case of a bioreactor used for other than wastewater treatment, it suffices to incorporate nutrients appropriate for the desired animal cells, plant cells and/or microorganisms concerned. The above list of nutrient substances is not intended to disallow inclusion of other substances utilizable as nutrients by the particular desired animal cells, plant cells and/or microorganisms being used.

When an attempt is made to culture plant cells for instance, auxin, cytokinin and other plant hormones can be included in the carrier.

Typical methods of using the invention carrier include the following:

(1) Method in which members selected from among inorganic salts, organic nitrogen sources, organic carbon sources and other substances the microorganisms can utilize as nutrients (culture medium constituents which most strongly promote proliferation of the desired animal cells, plant cells and/or microorganisms) are incorporated into the carrier consisting of an organic polymer substance at the time of its production. This is effected mainly by kneading the selected substances into the organic polymer substance starting materials.

(2) Method of casting the carrier into the bioreactor and using it together with the culture medium.

It is well known to selectively culture one or more desired microorganisms to the exclusion of others by utilizing the fact that each microorganism multiplies best in a specific nutrient environment. In this invention, it is preferable to take advantage of this characteristic of microorganisms by incorporating in the carrier a single nutrient source or a combination of up to several nutrient sources that only the desired microorganism or microorganisms can utilize.

Consider the case of using the carrier for wastewater treatment, for example. Useful microorganisms for this application include (1) BOD digest bacteria, (2) nitrification bacteria and (3) denitrification bacteria. The carrier cast into the biological reactor is therefore produced to incorporate the corresponding nutrient substance or substances, namely, at least one organic substance for (1), ammonia state nitrogen and/or at least one carbonate for (2), and at least one organic substance and/or nitrate state nitrogen for (3).

Microorganisms in the activated sludge in the reactor begin to proliferate on and inside the carrier after it is cast in. Since the carrier includes nutrient sources suitable for proliferation of the desired microorganisms, a growth environment different from that of the wastewater in the reactor (which is also a culture medium/nutrient source) is established at the carrier surface and interior. The desired microorganisms therefore adhere and multiply at the carrier surface and interior more rapidly than if the carrier contained no nutrient sources.

Since nitrification bacteria are slow breeders, their concentration among the floating organism groups, i.e., in the activated sludge, is not very high. The activated sludge method used in ordinary wastewater treatment is therefore unable to treat ammonia state nitrogen adequately. When the carrier of this invention is used, nitrification bacteria preferentially adhere and proliferate at the surface and interior of the carrier.

A problem has also existed regarding the concentration of denitrification bacteria. In conventional wastewater treatment, denitrification reaction is effected at the stage following nitrification reaction. Since hydrogen donors (soluble organic substances) indispensable for the denitrification reaction are decomposed on the way to this stage, however, the water under treatment is deficient in donors by the time it reaches the denitrification process.

This has been coped with by supplying the system with additional hydrogen donors or circulating the wastewater under treatment. The carrier according to the invention overcomes this problem by supplying hydrogen donors from substances contained therein to make up for the deficiency.

Since a nutrient environment differing from that of the medium in the reactor is thus established on and in the carrier, desired microorganisms can be selectively grown at the carrier surface and interior.

To enable this, the nutrient sources inside the carrier have to exude gradually for use by the microorganisms. The organic polymer substance constituting the carrier must swell in water to become a gel, be able to contain powder or liquid substances that become nutrients for microorganisms, and exhibit a water absorptivity of 50 to 1,700%. It is otherwise not particularly limited. From the practical aspect, a carrier which has (1) sufficient physical strength to withstand wear when fluidized by stirring in the reactor, (2) high compatibility with the animal cells, plant cells and/or microorganisms and a large surface area for adsorption and fixation thereon, and (3) good fluidity in the reactor is more preferable.

Usable organic polymer substances include, for example, such conventionally used ones as polyethylene glycol gel, polyvinyl alcohol gel and polyurethane gel. Polyurethane gel porous bodies and thermoplastic polyurethane gel and the like, explained later, are also usable.

Among these, the polyurethane gel porous bodies are excellent on points (2) and (3) mentioned above and can be incorporated with large amounts of nutrient substances in the process of being reacted with a large amount of water during production. Moreover, since the reaction temperature during production is low, the nutrient substances are not appreciably affected by heat. The types of nutrient substances that can be incorporated are therefore not particularly limited.

The polyurethane gel porous body consists of water-swellable polyurethane gel formed with interconnected pores and exhibiting a water absorptivity of 50–900% and a swelling rate of volume of 150–1,000%. As taught by Japanese Patent Application No. 8-139723, for example, it can be obtained by reacting a polyol compound, an isocyanate compound and water.

For instance, it can be obtained by two reaction steps:

The first reaction step is an attempt to prepare the reaction mixture which consists of water-soluble polyurethane polyol and free-polyisocyanate. This reaction mixture is prepared by reacting a polyether polyol which is selected from among, for example, (ethylene/propylene)glycols that are ethylene oxide/propylene oxide copolymers, and polyether polyols that are at least trivalent polyhydric polyols, and which has a hydroxy group equivalency of at least 500 and exhibits water solubility, with an isocyanate compound having an equivalency of about 1–4 moles per hydroxyl group of the polyether polyol (equivalency of 2–8). In the second step, the above reaction mixture is reacted with water so that the hydroxyl group content exceeds the isocyanate group in the reaction mixture, but has an equivalency of less than 300 per isocyanate group in the reaction mixture.

Among the usable organic polymer substances, the thermoplastic polyurethane gel is particularly excellent on points (1), (2) and (3) mentioned above and, moreover, is greatly superior to thermosetting, low-temperature-setting, or photo-reacting type water-containing gels in physical strength in the swollen state. The thermoplastic polyurethane gel is a water-swellable polyurethane gel that exhibits a water absorptivity of 50–1,700% and a swelling rate of volume of 150–4,000% and has been swollen by water absorption. As taught by Japanese Patent Application No. 8-263856, for example, the thermoplastic polyurethane gel can be obtained by reacting long-chain and short-chain polyol compounds and an isocyanate compound.

The nutrient substances can be added to this thermoplastic polyurethane gel at the stage of thermoplastic resin synthesis or can be added thereto at the stage of melting and shaping the thermoplastic resin. Even after the thermoplastic polyurethane gel has once been swollen with water, it can be reverted to thermoplastic resin by drying, melted, again added with nutrient substances, reshaped as a carrier of appropriate size and shape, swollen again by water absorption, and reused as fresh thermoplastic polyurethane gel.

Specifically, the thermoplastic resin can be obtained by, for example, reacting a long-chain diol compound consisting of an ethylene oxide-propylene oxide copolymer whose ethylene oxide content is not less than 70% or a polyethylene glycol and having a number-average molecular weight of 400–10,000, a short-chain diol compound having a number-average molecular weight of 30–400 and a diisocyanate compound having a number-average molecular weight of 100–1,000 at an NCO/OH equivalency ratio in the range of 1–5.

The water absorptivity is calculated from its dry weight and swollen weight using Equation (1) below.

"Dry weight" is the weight of the carrier when its weight loss becomes minimal during drying at 100° C.

"Swollen weight" is the weight thereof when the change in the weight of the entire amount of the carrier whose dry weight was measured becomes minimal during soaking in 25° C. pure water. In the case of porous bodies, the weight is measured after thorough removal of water from the pores by centrifuging at 100 rpm for 5 min.

$$\text{Water absorptivity}(\%) = \frac{\text{Swollen weight}(g) - \text{Dry weight}(g)}{\text{Dry weight}(g)} \times 100 \quad \text{Equation (1)}$$

When the water absorptivity is less than 50%, the carrier absorbs too little water. Its water content is therefore so small as to make the description "water-containing gel" inappropriate. Adherence of microorganisms is therefore poor. The fluidity of the carrier in the reactor is also low owing to its high specific gravity. The carrier should preferably have a specific gravity of not greater than 1.02 for optimum dispersion/fluidity thereof. For this, the water absorptivity must be not less than 50%. When the water absorptivity is greater than 1,700%, the carrier falls so low in strength as to lose its utility.

As an example, an explanation will now be given regarding wastewater treatment, particularly regarding treatment for the oxidization of ammonia state nitrogen into nitrate state nitrogen.

FIG. 1 is a schematic view for explaining a wastewater treatment system using the gel carrier of this invention. In this figure, reference numeral 1 designates a pre-sedimentation basin (a raw water tank), 2 a biological reactor (an aerator), 3 a post-sedimentation basin, 10 a NaOH tank and 11 a heater. Wastewater 4 is supplied from the pre-sedimentation basin 1 to the biological reactor 2 and treated biologically therein. The treated water 5 is removed of sediment in the post-sedimentation basin 3 and the supernatant water is discharged.

The biological reactor 2 is equipped with diffusers 6 which supply oxygen or air adjusted to an appropriate oxygen concentration for aeration. The air containing oxygen is supplied to the diffusers 6 by a blower 7.

The gel carrier 8 of this invention is cast into the biological reactor 2. As wastewater 4 is being fed to the biological reactor 2 and treated water 5 is being forwarded to the post-sedimentation basin 3, oxygen-containing air is blown from the diffusers 6 to supply oxygen to the mixed liquor 9 in the biological reactor 2.

The convection produced in the mixed liquor 9 by the upward flow of bubbles occurring at this time causes the pellets of gel carrier 8 to float and circulate within the biological reactor 2. The microorganisms which decompose and remove the organic pollutants present in the mixed liquor 9 adhere and fix to the gel carrier 8.

Since the gel carrier 8 has a very high water content at this time, it is highly compatible with the organisms. The mixed liquor 9 includes groups of floating microorganisms. These groups are of many types including, for example, BOD digest bacteria, thus oxidation bacteria of organic compounds that utilize organic pollutants as their nutrient source, nitrification bacteria that decompose ammonia state nitrogen into nitrate state nitrogen and denitrification bacteria that convert nitrate state nitrogen into nitrogen gas.

Since these microorganism groups look like grains of mud in water, they are also collectively referred to as activated sludge. The activated sludge may also contain earthworms, rotifers, vorticellae and other protozoans.

Among these floating microorganism groups, those that thrive on the nutrient substances contained in the gel carrier selectively fix themselves to the surfaces of the gel carrier pellets. In the biological reactor 2, the organic pollutants and nitrogen components in the wastewater are decomposed and removed by the action of both the organism groups fixed to the surfaces of the carrier pellets and the floating organism groups.

Since the ammonia state nitrogen contained in wastewater has been found to be a primary cause of river and ocean pollution, it is now seen as necessary to lower the amount of this pollutant in wastewater. The nitrification bacteria present in activated sludge convert the ammonia state nitrogen in wastewater to nitrate state nitrogen and the denitrification bacteria therein convert the nitrate state nitrogen to nitrogen gas which is released into the atmosphere.

Thus, large amounts of nitrification bacteria and denitrification bacteria must be retained in the reactor in order to efficiently treat the ammonia state nitrogen in the wastewater to the point of converting it to nitrogen gas. Use of the invention carrier in the biological treatment of the wastewater makes this possible.

EXAMPLES

The invention will now be explained with reference to examples. Carriers were synthesized as follows.
Carrier Production Example 1 (Production of Polyurethane Gel Porous Bodies Containing Glucose)

Thirty grams of glucose was added to 100 g of a reaction mixture consisting of water soluble polyurethane prepolymer and free polyisocyanate (NCO: 3.8%, Sanplene WE-104, Sanyo Chemical Industries, LTD.), thoroughly stirred, and 100 g of water was mixed into the result (OH equivalency of 123 relative to NCO), whereafter the mixture was vigorously stirred and foamed.

The resulting polyurethane gel porous material was diced into 4 mm cubes to afford polyurethane gel porous bodies containing 30% glucose. The water absorptivity of the polyurethane gel porous bodies was 600%.

Example 2 (Production of Polyurethane Gel Porous Bodies Containing Glucose)

Seventy grams of glucose was added to 100 g of a reaction mixture consisting of water soluble polyurethane prepolymer and free polyisocyanate (NCO: 3.8%, Sanplene WE-104, Sanyo Chemical Industries, LTD.), thoroughly stirred and 100 g of water was mixed into the result (OH equivalency of 123 relative to NCO), whereafter the mixture was vigorously stirred and foamed.

The resulting polyurethane gel porous material was diced into 4 mm cubes to afford polyurethane gel porous bodies containing 70% glucose. The water absorptivity of the polyurethane gel porous bodies was 550%.

Example 3 (Production of Polyurethane Gel Carrier Containing Ammonium Sulfate)

68.2 parts by weight of polyethylene glycol (molecular weight: 2,000) was placed in a glass container under gentle stirring at 100° C. in a nitrogen gas atmosphere, added with 25.6 parts by weight of diphenylmethane diisocyanate and then stirred for another 30 min. The result was added with 6.2 parts by weight of 1,4-butanediol, stirred for 10 min, added with 10 parts by weight of ammonium sulfate powder, and mixed to uniformity. The pasty reaction product was removed from the glass container and post-cured at 80° C.

The reaction product was applied with a pressure of 40 kg/cm$^2$ at 120° C. to form it into a 1-mm thick sheet. The sheet was finely cut and the pieces were swollen in water to obtain polyurethane gel carriers containing 10% ammonium sulfate. The water absorptivity of the polyurethane gel carrier was 230%.

Example 4 (Production of Polyurethane Gel Carrier Containing Ammonium Sulfate and Potassium Carbonate)

68.2 parts by weight of polyethylene glycol (molecular weight: 2,000) was placed in a glass container under gentle stirring at 100° C. in a nitrogen gas atmosphere, added with 25.6 parts by weight of diphenylmethane diisocyanate and then stirred for another 30 min. The result was added with 6.2 parts by weight of 1,4-butanediol, stirred for 10 min, added with 10 parts by weight of ammonium sulfate powder and 10 parts by weight of potassium carbonate powder, and mixed to uniformity. The pasty reaction product was removed from the glass container and post-cured at 80° C.

The reaction product was applied with a pressure of 40 kg/cm$^2$ at 120° C. to form it into a 1-mm thick sheet. The sheet was finely cut and the pieces were swollen in water to obtain polyurethane gel carriers containing 10% ammonium sulfate and 10% potassium carbonate. The water absorptivity of the polyurethane gel carrier was 250%.

Example 5 (Production of Polyvinyl Alcohol Gel Carrier Containing Ammonium Sulfate)

Polyvinyl alcohol powder (polymerization degree: 2,000, saponification degree: 99.8%) was dissolved in water to prepare a 12 wt % aqueous solution of polyvinyl alcohol. With 500 g of this solution was mixed 250 g of a 4 wt % aqueous solution of sodium alginate. Into the mixed solution maintained at 0–5° C. was mixed 14 g of ammonium sulfate.

The resulting solution was dripped from a nozzle into a coagulating solution. The coagulating solution was an aqueous solution of boric acid at a concentration of 12 g/l and potassium chloride at a concentration of 30 g/l. The dripped liquor coagulated into spheres. The resulting gel spheres were removed and transferred to a saturated aqueous solution of sodium sulfate and left to stand therein for two hours to obtain polyvinyl alcohol gel carrier spheres containing 20% ammonium sulfate. The gel spheres measured about 4 mm in diameter and had a water absorptivity of 650%.

Example 6 (Production of Polyethylene Glycol Gel Carrier Containing Ammonium sulfate)

Fifteen parts by weight of polyethyleneglycol dimethacrylate (23 G, Shin Nakamura Chemical Industries, Ltd.) and 0.6 part by weight of (dimethylamino)propionitrile were dissolved in 84.4 parts by weight of water. Three parts by weight of ammonium sulfate was added to the result. The solution was then added with 35 parts by weight of a 0.2% aqueous solution of potassium persulfate, thoroughly stirred, poured into a mold and gelled. The gel was removed from the mold and cut to afford polyethylene glycol gel carriers containing 20% ammonium sulfate. The water absorptivity of the polyethylene glycol gel carrier was 800%.

Comparative Example 1

A carrier produced according to Example 1 but without adding glucose was used as a comparative example. The water absorptivity of the polyurethane gel porous bodies was 600%.

Comparative Example 2

Two hundred grams of glucose was added to 100 g of a reaction mixture consisting of water soluble polyurethane prepolymer and free polyisocyanate (NCO: 3.8%, Sanplene WE-104, Sanyo Chemical Industries, LTD.), thoroughly stirred, and 100 g of water was mixed into the result (OH equivalency of 123 relative to NCO), whereafter the mixture was vigorously stirred and foamed. The polyurethane gel porous bodies obtained disintegrated when soaked in water.

Comparative Example 3

One hundred grams of triol type polyalkylene glycol (Unirube SOTG32U, NOF Corporation), 3.0 g of DABCO33LV (Toso Co., Ltd.) as catalyst, 2.5 g of Toray Silicon SH-190 (Toray-Silicon) as foaming regulator and 7.0 g of water (OH equivalency of 0.93 relative to NCO) as foaming agent were thoroughly mixed and the mixture was reacted with 84.1 g of isocyanate compound (Coronate T-180, Nippon Polyurethane Co., Ltd.). The resulting polyurethane gel porous material was diced into 4 mm cubes to afford polyurethane porous bodies. The water absorptivity of the polyurethane porous bodies was 15%.

Comparative Examples 4–6

Carriers produced according to Examples 4–6 but without adding ammonium sulfate and/or potassium carbonate were used as comparative examples. The water absorptivities of the carriers of Comparative Examples 4, 5 and 6 were 230%, 650% and 800%, respectively.

Short-term wastewater treatment tests were conducted using 11 of the 12 carriers obtained in the foregoing Examples and Comparative Examples, excluding the one that was too low in physical strength to be tested. The weight of the microorganism cells adhering to the carrier was measured following each test. In addition, long-term water treatment tests were conducted using the polyurethane gel porous bodies of Example 1 and Comparative Example 1. The results are shown in Table 5.

The physical strengths of the carriers are rated in Table 5 using the symbols ○ for satisfactory, ◉ for outstanding and × for problematic (disintegration etc.).

<Short-Term Wastewater Treatment Tests>

Tests conducted with the carriers of Examples 1 and 2 and Comparative Examples 1 and 3:

The wastewater treatment testing system of FIG. 1 was used. The 20-l aerator (biological reactor) 2 was charged with 2 l of carrier and 10 g. SS of seed active sludge. Tests were conducted using the artificial wastewater of Table 1 under the conditions of Table 2.

TABLE 1

| Composition | Concentration (mg/l) |
|---|---|
| Glucose | 150 |
| Glutamic acid | 150 |
| $NH_4Cl$ | 50 |
| $CaCl_2 \cdot 2H_2O$ | 2 |
| $MgSO_4 \cdot 7H_2O$ | 8 |
| $KH_2PO_4$ | 7 |
| $Na_2HPO_4 \cdot 12H_2O$ | 29 |
| BOD | 260 |

TABLE 2

| Reactor residence time | 8 hrs |
|---|---|
| Return sludge | None |
| BOD load | 0.78 kg · BOD/m³ · day |
| pH | 7.0 (Controlled) |
| DO | 4–7 mg/l |
| Water temp. | 25° C. (Controlled) |

Two weeks after adding the carrier, the BODs of the raw wastewater and the treated wastewater were measured and the BOD removal rate calculated. The carrier used in the two-week test was tested in the manner described below to determine the weight of adhering microorganism cells. Tests conducted with the carriers of Examples 3–6 and Comparative Examples 4–6:

The wastewater treatment testing system of FIG. 1 was used. The 20-l aerator (biological reactor) 2 was charged with 2 l of carrier and 10 g of *Nitrobacter agilis*. Tests were conducted using the artificial wastewater of Table 3 under the conditions of Table 4.

TABLE 3

| Composition | Concentration (mg/l) |
|---|---|
| $NH_4Cl$ | 191 |
| $CaCl_2 \cdot 2H_2O$ | 2 |
| $MgSO_4 \cdot 7H_2O$ | 8 |
| $KH_2PO_4$ | 7 |
| $Na_2HPO_4 \cdot 12H_2O$ | 29 |
| $NH_4$—N | 50 |

TABLE 4

| Reactor residence time | 8 hrs |
|---|---|
| Return sludge | None |
| $NH_4$—N load | 0.15 kg · N/m³ · day |
| pH | 7.0 (Controlled) |
| DO | 4–7 mg/l |
| Water temp. | 25° C. (Controlled) |

Two weeks after adding the carrier, the $NH_4$—N concentrations of the raw wastewater and the treated wastewater were measured and the $NH_4$—N removal rate calculated. The carrier used in the two-week test was tested in the manner described below to determine the weight of adhering microorganism cells.

<Microorganism Cell Adherence Tests>

Tests conducted with the carriers of Examples 1 and 2 and Comparative Examples 1 and 3:

Thirty carriers were removed from the aerator and washed in as little pure water as possible. All of the washing water was collected. The carrier-retained sludge was calculated from the weight of the MLSS (mixed liquor suspended solids) in the washing water and the volume of the 30 carriers.

Carrier-retained sludge (g-SS/carrier) =

$$\frac{\text{Weight of } MLSS \text{ in washing water (mg)}}{\text{Volume of 30 carriers (ml)}}$$

Tests conducted with the carriers of Examples 3–6 and Comparative Examples 4–6:

Thirty carriers were removed from the aerator and placed in a 100-ml measuring flask. The flask was filled with pure water. The measuring flask was immersed in an ultrasonic washer and the washer was operated to dislodge the microorganism cells from the carrier pellets. A nitrification bacteria detection kit (Immuno Latex "Kenshutsu-kun" Yakult Co., Ltd.) was used to determine the number of nitrification bacteria in the microorganism cell suspension in the measuring flask. In the measurement, the number of microorganism cells was evaluated from the number of dilutions of the standard microorganism cell suspension, without use of a standard antigen.

<Long-Term Waste Water Treatment Test>

TABLE 5

| | Carrier | Nutrient substance | Content (%) | Water absorptivity (%) | Physical strength | Initial performance in treatment test (Removal rate %) | Cell adherence | Wastewater treatment test |
|---|---|---|---|---|---|---|---|---|
| Example 1 | Polyurethane gel porous bodies | Glucose | 30 | 600 | ○ | 95 | 7.5 g-SS/l | Excellent |
| Example 2 | Polyurethane gel porous bodies | Glucose | 70 | 550 | ○ | 90 | 7.8 g-SS/l | — |
| Comparative Example 1 | Polyurethane gel porous bodies | — | 0 | 600 | ○ | 73 | 5.6 g-SS/l | Good |
| Comparative Example 2 | Polyurethane gel porous bodies | Glucose | 200 | — | X | — | — | — |
| Comparative Example 3 | Polyurethane porous bodies | — | 0 | 15 | ○ | 68 | 3.4 g-SS/l | — |
| Example 3 | Polyurethane gel carrier | $(NH_4)_2SO_4$ | 10 | 230 | ⊚ | 75 | Good | — |
| Example 4 | Polyurethane gel carrier | $(NH_4)_2SO_4$ $K_2CO_3$ | 10 10 | 250 | ⊚ | 72 | Good | — |
| Comparative Example 4 | Polyurethane gel carrier | — | 0 | 230 | ⊚ | 47 | Fair | — |
| Example 5 | Polyvinyl alcohol gel carrier | $(NH_4)_2SO_4$ | 20 | 650 | ○ | 80 | Good | — |
| Comparative Example 5 | Polyvinyl alcohol gel carrier | — | 0 | 650 | ○ | 51 | Fair | — |
| Example 6 | Polyethylene glycol gel carrier | $(NH_4)_2SO_4$ | 20 | 800 | ○ | 78 | Good | — |
| Comparative Example 6 | Polyethylene glycol gel carrier | — | 0 | 800 | ○ | 53 | Fair | — |

Since the carrier according to the invention contains more substances utilizable as nutrients by microorganisms in the interior thereof than do ordinary carriers, it excels in power to retain microorganisms on its surface and in its interior.

Moreover, preferential adherence and proliferation of desired microorganisms is possible by appropriately selecting the substances incorporated as microorganism nutrients. A wastewater treatment system utilizing the invention carrier therefore provides high purification performance during startup.

What is claimed is:

1. A carrier for a bioreactor comprising an organic polymer substance which is a water swellable thermoplastic polyurethane gel that exhibits a water absorptivity of 50 to 1700% and a swelling rate of volume in water of 150 to 4000% and contains an inorganic salt, organic nitrogen source and/or organic carbon source utilizable as a nutrient by microorganisms, plant cells or animal cells useful in the bioreactor, wherein the thermoplastic polyurethane gel is obtained by reacting a long-chain diol compound having a number average molecular weight of 400 to 10,000 selected from the group consisting of an ethylene oxide-propylene oxide copolymer whose ethylene oxide content is not less than 70% and a polyethylene glycol, a short-chain diol compound having a number-average molecular weight of 30 to 400 and a diisocyanate compound having a number-average molecular weight of 100 to 1,000 at an NCO/OH equivalency ratio in the range of 1–5.

* * * * *